Patented Aug. 4, 1953

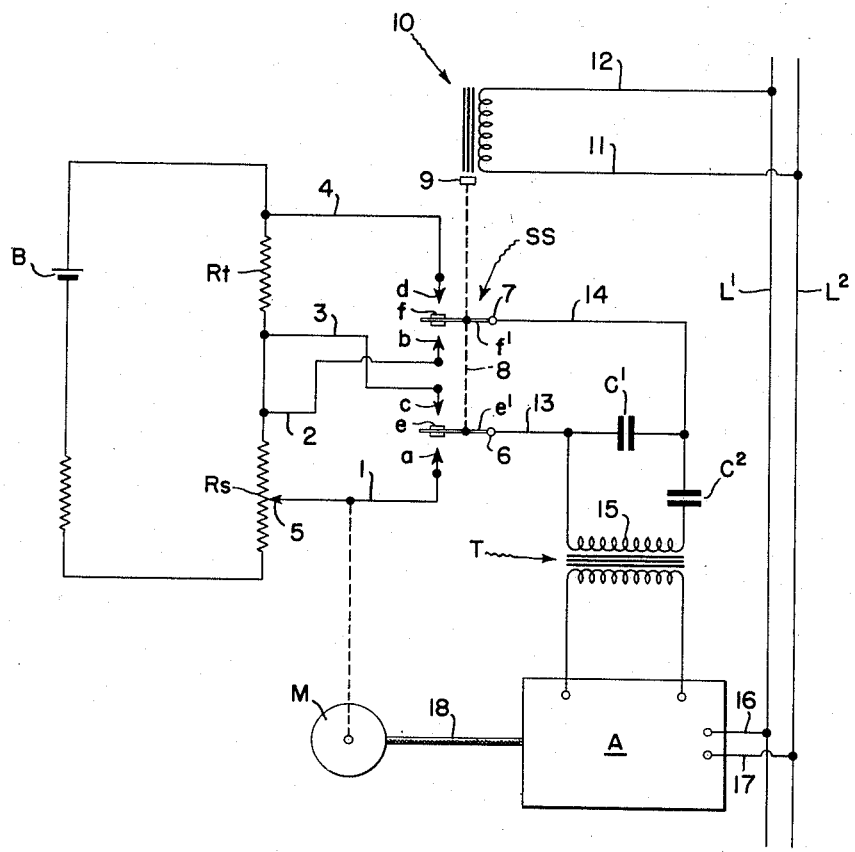

2,648,037

UNITED STATES PATENT OFFICE 2,648,037

MEASURING APPARATUS

Thomas R. Harrison, Wyncote, Pa., assignor to Minneapolis-Honeywell Regulator Company, Minneapolis, Minn., a corporation of Delaware Application February 18, 1950, Serial No. 144,918

3 Claims. (Cl. 318—28)

The general object of the present invention is to provide improved apparatus for measuring small variations in the resistance of a variable resistor, and, when desired, for producing control effects in response to variations in the resistance measurements. The present invention was primarily devised for use in resistance thermometers including a temperature responsive resistor varying in resistance with the temperatures to which it is exposed.

In accordance with the present invention, I connect in series in an energizing circuit, a battery or other source of direct current, the variable resistor, the resistance of which varies in response to variations in a controlling condition such as its temperature, and an adjustable comparison resistor, the resistance of which does not vary with changes in said condition, but is varied by the adjustment of the resistor. The comparison resistor may well be a slide wire resistor with an associated slider contact adjustable along the slide wire to vary the amount of resistance included in a comparison circuit. The resistance of the comparison resistor may thus be adjusted as required to keep it equal to the varying resistance of the variable resistor. In the preferred form of the invention, the adjustment of the comparison resistor is effected automatically in response to variations in the voltage drops in the two resistors. When the comparison resistor is a slide wire resistor and its adjustment is effected by the adjustment of a slider contact, the resistance equalizing position of the slider contact along the slide wire resistor provides a linear measure of the actual resistance of the variable resistor, and a linear measure of the temperature of that resistor, if the latter is a thermometer resistance.

A primary object of the present invention is to provide simple and effective means for effecting a comparison of the resistances of the two resistors in such a manner than when the resistances of the latter are equalized, and the resistance of the variable resistor is thereby measured, the measurement will not be subjected to error as a result of variations in the resistances of the leads connecting the variable resistor to the measuring apparatus. The invention is thus adapted to avoid a common source of error in resistance thermometers arising from the variations in the resistances of the leads or conductors connecting the ends of the variable resistor to the measuring apparatus. Such variations in lead resistance may result from variations in the lengths or in the temperatures of the leads.

For the purposes of the present invention, I have devised means for comparing the two voltages by impressing them in rapid alternation on a detector circuit so that when the voltages are unequal, an alternating current will be produced in the detector circuit of a magnitude and phase respectively dependent on the extent and direction of difference between the two voltages. The alternating current thus produced is used to actuate means for adjusting the adjustable resistor in the direction and to the extent required to equalize the two voltages and thus make the resistance of the adjustable comparison resistor equal to the actual momentary resistance of the variable resistor.

In the preferred form of the present invention, I employ measuring apparatus including a voltage and motor drive amplifier of well known type, and impress the alternating current signal developed when the resistors are alternately connected in rapid succession to the detector circuit, to actuate a reversible rebalancing motor, through which I adjust the comparison resistor as needed to make its resistance equal to the actual momentary resistance of the variable resistor.

In the preferred form of the present invention, I use condenser means to hold the voltage impressed on the input circuit of the amplifier when connected to each resistor during the small fraction of a second required to disconnect that resistor from the amplifier, and to connect the other resistor to the amplifier, thereby to minimize the tendency to pick-up of stray alternating voltages in the amplifier.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

The drawing is a diagram illustrating a preferred embodiment of the present invention.

In the simple form of the invention diagrammatically illustrated in the drawing, a temperature responsive resistor or thermometer resistance $Rt$ is connected in series with a slide wire resistor $Rs$ and a battery $B$ in a closed circuit. The terminals of the thermometer resistance $Rt$ are connected by terminal conductors 3 and 4 to stationary switch contacts $c$ and $d$, respectively.

One terminal of the slide wire resistor Rs is connected by a conductor 2 to a third stationary switch contact b, and a slider contact 5 engaging and adjustable along the resistor Rs is connected by a conductor 1 to a fourth stationary contact a. The contacts a, b, c and d all form parts of a polarized switch mechanism SS employed to alternately connect the resistors Rt and Rs with a predetermined frequency to measuring and control apparatus including an amplifier A.

Said switch mechanism SS, as diagrammatically shown, comprises a pair of vibrating switch contacts e and f. As shown, the vibrating contact e alternately engages the stationary switch contacts a and c with a suitable frequency which may well be 60 cycles per second, and the vibrating contact f alternately engages the stationary contacts b and d with the same frequency, and during the same periods at which the contact e respectively engages the contacts a and c.

As diagrammatically shown, the contacts e and f are connected to and carried by the free ends of flexible reeds e' and f', respectively, which have their other ends anchored at points 6 and 7. The means diagrammatically shown for vibrating the reeds e' and f' comprise a transverse rod 8 secured to each reed intermediate its ends and carrying a polarized armature 9 at its free end. The armature 9 is alternately attracted and repelled by an electromagnet 10 once during each cycle of the alternating voltage across alternating current supply conductors L' and L² to which the terminal conductors 11 and 12 of the electromagnet are connected. The vibrating contacts e and f are shown as connected through the associated reeds e' and f' to conductors 13 and 14. The latter may be regarded as the input conductors of the amplifier A. As shown, the conductors 13 and 14 are connected to the amplifier through a non-conductive coupling, shown as a transformer T and having its primary winding 15 connected between the conductors 13 and 14.

The amplifier A controls the operation of a control motor M which maintains the measuring apparatus in balance by adjusting the slider contact 5 along the resistor Rs as required to make the potential drop in the portion of the resistor Rs between the conductors 1 and 2 equal to the potential drop in the resistor Rt.

As shown, the amplifier A is energized through branches 16 and 17 of the supply conductors L' and L² and energizes the power and control windings of the motor M through conductors included in a cable 18.

As previously stated, the amplifier A and rebalancing motor M may be of well known type. In particular, they may well be of the type included in the well known and widely used self-balancing potentiometric instrument, which is disclosed and claimed in the Wills Patent 2,423,540, of July 8, 1947. It is to be noted, however, that the Wills patent discloses a converter for converting a D. C. signal into an alternating current signal, preparatory to its amplification, which is replaced in the apparatus disclosed herein by the previously described switch SS. The latter differs in form and in the character of its associated measuring circuit provisions from the converter of the Wills patent, although it serves the same general purpose of converting a direct current signal into an alternating current signal prior to the amplification of the signal. From the structural standpoint, applicant's switch SS differs primarily from the Wills patent converter in that it comprises two vibrating reeds and may thus be designated a double pole converter, whereas, the converter of the Wills patent includes a single vibrating reed and may be called a single pole converter. Each of applicant's vibrating reeds e' and f' and associated vibrating mechanism may be replaced by the single vibrating converter reed and its vibrating mechanism shown in the Wills patent.

As shown, a condenser C' is connected in parallel, and a condenser $C^2$ is connected in series with the primary winding 15 of the transformer T. Each condenser tends to maintain the charge impressed on it when momentarily connected to either of said resistors, during the following small fraction of a second required to disconnect that resistor from the amplifier and to connect the other resistor thereto.

The condenser C' also serves to hold the voltage on the primary winding during the period in which both of said resistors are disconnected from the primary winding 15 and thereby serves to minimize the pick-up of stray alternating signals. In consequence of this condenser action during periods in which the measuring apparatus is balanced and the potential drops in the resistors Rs and Rt are equal no alternating voltage signal is transmitted through the transformer T to the amplifier.

When the measuring apparatus is unbalanced as a result of a change in resistance of the thermometer resistor Rt, an alternating voltage signal of one phase or of opposite phase, depending upon the direction of the change in resistance of resistor Rt, is transmitted through the transformer T to the amplifier A. That alternating voltage signal is amplified by the amplifier A and utilized as described in the aforementioned Wills patent to energize the reversible motor M for rotation in the direction required to make the potential tapped off the slide wire resistor Rs equal and opposite to the potential then maintained across the thermometer resistor Rt.

In the normal operation of the apparatus, the condenser $C^2$ is alternately connected through the primary winding 15 of the transformer T in circuit with the potential across the thermometer resistor Rt and the potential tapped off the slide-wire resistor Rs.

During the half cycle when condenser $C^2$ is connected in circuit with the thermometer resistor Rt, the condenser $C^2$ tends to assume a voltage equal to the potential existing across the thermometer resistor Rt. In the next half cycle when the condenser $C^2$ is connected in circuit with the slidewire resistor Rs, the condenser $C^2$ tends to assume a voltage equal to the potential tapped off said slidewire. No current flows in either circuit to or from the condenser $C^2$ when the voltage on the condenser $C^2$ is the same as the potential across resistor Rt and that potential is the same as the potential tapped off the slidewire Rs. Since there is then no tendency for the voltage on the condenser $C^2$ to change, no current will flow through the primary winding 15 of the transformer T and no alternating voltage signal will be transmitted to the amplifier A.

Upon a change in the resistance of the thermometer resistor Rt, however, the voltage assumed by the condenser $C^2$ as it is alternately connected to the resistors Rt and Rs will fluctuate between a value corresponding to the new potential maintained across the resistor Rt and the value of the potential tapped off the slidewire Rs. Such fluctuation in voltage assumed by the condenser $C^2$ will be accompanied, as those skilled in the art will understand, by a fluctuating corresponding current flow through the primary winding 15 of the transformer T. That fluctuating current flow is effective to establish in the secondary winding of the transformer T an alternating voltage signal of the same frequency as the voltage of the alternating current supply conductors and of one phase or of opposite phase depending upon the direction of the fluctuating current flow in the primary winding 15 and thereby upon the direction of change in resistance of the thermometer resistor $Rt$.

The operation of the amplifier A and the motor M, as explained hereinbefore, in response to the alternating voltage signal in the secondary winding of the transformer T is such as to adjust the slider contact 5 along the slide wire resistor $Rs$ in the proper direction to make the potential tapped off the slidewire $Rs$ equal and opposite to the new potential across the thermometer resistor $Rt$. The position of the slider contact 5 along the slide wire resistor $Rs$ thereby provides a measure of the potential across the thermometer resistor $Rt$, and, hence, a measure of the temperature to which the resistor $Rt$ is subjected. In addition to its potential holding action, the condenser $C^2$ prevents a flow of current through the primary winding 15 of the transformer T which would tend to saturate the transformer core, and more importantly, it prevents the flow of D. C. current through the closed circuit including the resistor $Rt$, the primary coil 15, and their connecting conductors 3, 4, $e'$, $f'$, 13 and 14 and contacts $c$, $e$, $d$ and $f$. Such current flow would tend to produce measurement errors under conditions in which the resistances of the lead conductors 3 and 4 were subject to variation. When the measuring apparatus employed to measure the differences in the voltages of the resistors $Rt$ and $Rs$ is of the null type self-balancing character disclosed in the Wills patent, each of the condensers $C'$ and $C^2$ may be omitted without modifying the general operation of the apparatus, though under certain circumstances, there would then be a tendency to a chattering and undesired operation of the motor M which would be prevented by the use of either condenser. Moreover, the omission of the isolation function of the condenser $C^2$ would result in measurement errors avoided when that condenser is used. As will be apparent to those skilled in the art, the battery B may be replaced in a known manner by means including a rectifier for converting alternating current supplied by the supply conductors $L'$ and $L^2$ into direct current of a suitable voltage for use in the energizing circuit including the resistors $Rs$ and $Rt$.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Measuring apparatus, comprising a variable resistor having end terminals and adapted to have the resistance therebetween varied in accordance with variations in the value of a condition, a comparison resistor having end terminals, conductor means connected to said end terminals and connecting said resistors in series with each other between a pair of energizing terminals adapted to be connected to a source of direct current energizing voltage, whereby the same current is caused to flow through and produce voltage drops across both of said resistors, a contact adjustable along said comparison resistor, a pair of output conductors, a switching means connected between said resistors and said output conductors and operative to connect the end terminals of said variable resistor to said output conductors during periods which alternate with others in which said switching means is operative to connect one of the end terminals and the contact of said comparison resistor to said output conductors, said switching means thereby being operative to apply alternately to said output conductors the voltage drop across said variable resistor and the voltage drop between said one end terminal and said contact of said comparison resistor, and alternating current voltage responsive means having an input portion connected between said output conductors, having an output means mechanically connected to said contact, and operative to adjust the latter along said comparison resistor in accordance with the difference between said voltage drops as necessary to equalize the latter and to adjust the resistance of said comparison resistor between said one end terminal and the contact thereof into equality with the resistance between the end terminals of said variable resistor.

2. Apparatus as specified in claim 1, wherein said input portion includes a condenser and an impedance connected in series between said output conductors, and includes an input circuit effectively connected across only said impedance.

3. Apparatus as specified in claim 2, wherein said switch means includes a first movable contact operative to engage first and second stationary contacts alternately, and includes a second movable contact operative to engage third and fourth stationary contacts as said first movable contact respectively engages said first and second stationary contacts, and wherein said second and third stationary contacts are connected to the connected end terminals of said resistors, said first and fourth stationary contacts are respectively connected to the remaining end terminal of said variable resistor and to said contact, and said movable contacts are respectively connected to said output conductors.

THOMAS R. HARRISON.

References Cited in the file of this patent

UNITED STATES PATENTS

| Number | Name | Date |
|---|---|---|
| 1,852,704 | Dowling | Apr. 5, 1932 |
| 2,300,742 | Harrison et al. | Nov. 3, 1942 |
| 2,423,540 | Wills | July 8, 1947 |
| 2,476,318 | Nelson | July 19, 1949 |